Sept. 21, 1943.  L. M. ASHLEY  2,329,684
VEHICLE HEADLIGHT CONTROL
Filed Oct. 25, 1941
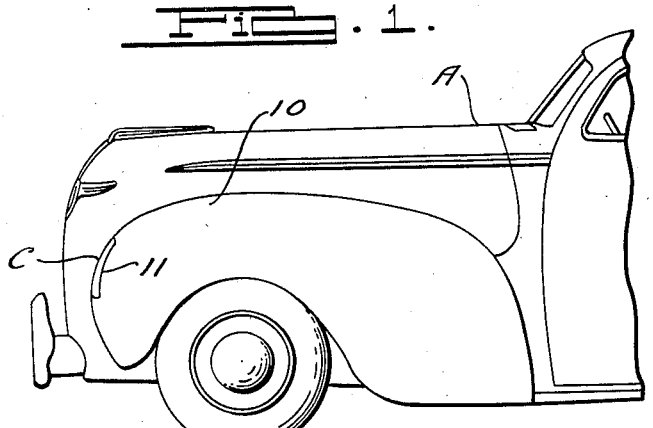
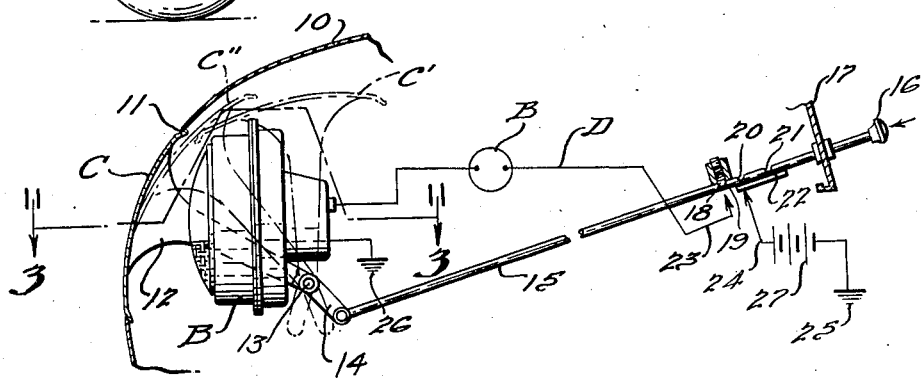
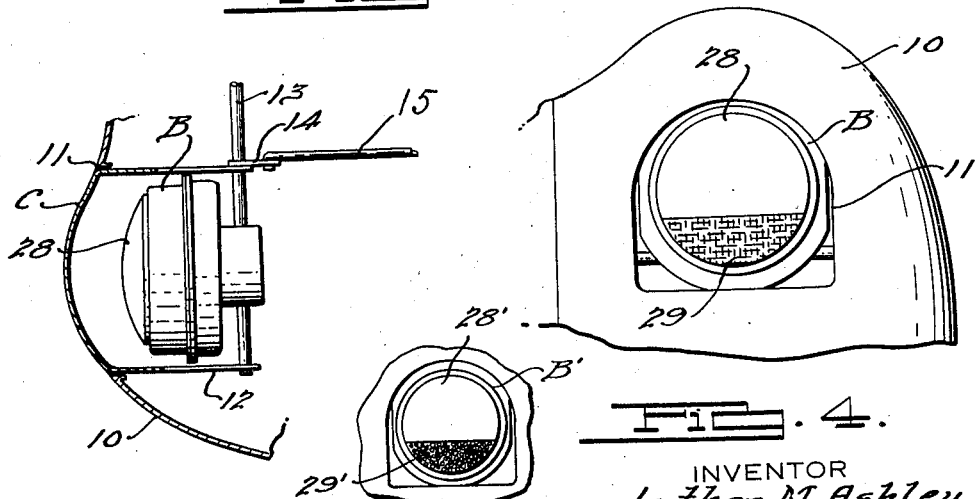
INVENTOR
Luther M. Ashley.
BY
ATTORNEYS.

Patented Sept. 21, 1943

2,329,684

UNITED STATES PATENT OFFICE 2,329,684

VEHICLE HEADLIGHT CONTROL

Luther M. Ashley, Pontiac, Mich., assignor to Chrysler Corporation, Highland Park, Mich., a corporation of Delaware Application October 25, 1941, Serial No. 416,455

4 Claims. (Cl. 240—7.1)

This invention relates to motor vehicles and refers more particularly to improvements in the control of lamps commonly referred to as headlights.

My invention is particularly directed to headlight arrangements of the concealed type wherein the headlights are disposed rearwardly of frontal openings in the vehicle, such as wheel fender openings, masking means being operably associated with each opening for selectively masking or unmasking the headlight. In such arrangements it is customary to provide a control system for the masking means such that the driver is able to effect the selective masking and unmasking of the headlights.

One object of my invention is to provide a novel control system for headlight masking means such that, when desired, the masking means may be disposed intermediate their customary selective positions aforesaid, thereby only partially masking the headlights. Such arrangement serves as a fog-light without requiring additional lamps or accessories adapted for affording illumination when driving through fog when full illumination from the headlights results in the well known effect of the light rays reflecting back to the driver instead of illuminating the roadway.

Another object of my invention is to provide a headlight control as aforesaid in which a portion of the headlight lens is colored suitably to facilitate fog-penetration by the light rays. I have found that by coloring a segmental portion of the headlight lens yellow or orange and exposing such portion to the opening during the intermediate position of the masking means, a good fog-light is thereby provided without materially detracting from the desired white light illumination when driving without fog and with the headlight fully unmasked.

Further objects and advantages of my invention will be more apparent as this specification progresses in describing the details of a typical embodiment, reference being had to the accompanying drawing in which:

Fig. 1 is a side elevational view of the forward end portion of a motor vehicle equipped with my invention.

Fig. 2 is a sectional side elevational view showing one of the headlights and diagrammatically illustrating my control system therefor.

Fig. 3 is a sectional plan view of a portion of the Fig. 2 showing, the section being taken as indicated by line 3—3 of Fig. 2.

Fig. 4 is a front elevational view looking at the Fig. 2 headlight.

Fig. 5 is a front elevational view of a modified form of headlight lens.

Referring to the drawing I have illustrated a generally conventional motor vehicle A having streamlined frontal surfaces appropriate for cooperation with headlight masking means. In the present illustration, each front wheel fender 10 is utilized to house a headlight B suitably stationarily mounted at the rear of a fender opening 11.

Masking means C is shown in the form of a shield or "eyelid" operably associated with each fender opening 11 for selective movement between a first position (Figs. 1 to 3) of fully masking an adjacent headlight B to a second position C' (Fig. 2) of fully unmasking the headlight. In the first said position the shield preferably preserves the streamlined outline of the fender 10, the shield being suitably shaped and mounted for this purpose.

Each shield C is provided with arms 12 for fixedly mounting the same on a transverse rock-shaft 13 having a lever 14 for actuation by a push-pull rod 15 extending to a hand control knob 16 at the instrument panel 17 for convenient manipulation by the driver. Rod 13 extends across the body to the right hand shield which is not shown but which is similar to the Fig. 3 shield. Some means is preferably provided to releasably stop the rod 15 at its opposite ends of movement, and also at an intermediate position to be presently described, thereby to assist the driver in desired adjustment of shields C. I have illustrated such means in the form of a spring detent ball 18 releasably engageable with rod detents 19, 20 and 21.

By preference, illumination of the lamps B is controlled in response to driver manipulation of knob 16 and to this end I have mounted on suitable insulation a switch conductor 22 so arranged as to electrically disconnect wires 23, 24 when ball 18 engages detent 19 but to electrically connect these wires when this ball engages either of the remaining detents 20, 21. A suitable circuit D between grounds 25, 26 is arranged to include both lamps B and battery 27 so that the lamps are illuminated when wires 23, 24 are connected at switch 22.

Each headlight B has a clear glass or other transparent plastic lens 28 either of conventional form or else, as illustrated in Fig. 4, formed with a light diffusing segment 29 of orange or yellow color or other light diffusing configuration either colored or clear. In Fig. 5 the light B' has its lens 28' formed with a segment 29' of light diffusing surface irregularities or refractors so as to diffuse the light passing therethrough. This segment 29 or 29' for the type of shield C illustrated, is disposed at the bottom of lens 28 and preferably comprises less than one-half of the total lens area. With such an arrangement, the resulting fog light is located as low as possible, for a given mounting of light B, this being advantageous as is known with conventional auxiliary fog lights which are customarily located below the usual headlights.

In Figs. 3 and 4 the shields C are disposed to fully mask their associated headlights which are not illuminated because circuit D is open at switch 22. When the driver desires maximum illumination for normal driving conditions, he pushes knob 16 forwardly to register detent 21 with ball 18. This closes circuit D to illuminate the headlights and also actuates rockshaft 13 to cause both shields C to swing upwardly and inwardly to the C' position of fully unmasking the headlights.

When driving in a fog or under other conditions when less than full illumination is desired, the driver adjusts rod 15 to register ball 18 with detent 20. This causes the shields C to be adjusted to a position C'' intermediate positions C and C' whereby only the lens portion 29 of each light is unmasked.

The detent 20 in conjunction with ball 18 constitutes means, operating as an incident to driver adjustment of rod 15 to locate the shields at their intermediate positions C'', for releasably holding the shields in their intermediate positions against vibrating shut or out of the desired relationship with lamps B while driving the vehicle.

I claim:

1. In a motor vehicle having a frontal surface formed with an opening, a headlight disposed rearwardly of and facing said opening; masking means operable from a first position of closing said opening to a second position affording unobstructed passage of light rays from said headlight through said opening; means operable under control of the vehicle driver for effecting selective operation of said masking means to said first and second positions and to a third position intermediate said first and second positions; said masking means, when in said third position, only partially masking said headlight; said headlight having a lens facing said opening, and formed with a light-diffusing portion disposed adjacent the bottom of the lens face such that said masking means, when in said third position, masks the remaining portion of the lens while leaving said light-diffusing portion unmasked.

2. In a motor vehicle having a frontal surface formed with an opening, a headlight disposed rearwardly of and facing said opening; masking means operable from a first position of closing said opening to a second position affording unobstructed passage of light rays from said headlight through said opening; means operable under control of the vehicle driver for effecting selective operation of said masking means to said first and second positions and to a third position intermediate said first and second positions; said masking means, when in said third position, only partially masking said headlight; said headlight having a lens facing said opening, said lens having a body portion of clear transparency and a second colored lens portion of light-diffusing character so disposed that said masking means, when in said third position, masks said first lens portion while leaving said second portion unmasked.

3. In a motor vehicle having a frontal surface formed with an opening, a headlight disposed rearwardly of and facing said opening; masking means operable from a first position of closing said opening to a second position affording unobstructed passage of light rays from said headlight through said opening; means operable under control of the vehicle driver for effecting selective operation of said masking means to said first and second positions and to a third position intermediate said first and second positions; said masking means, when in said third position, only partially masking said headlight; said headlight having a lens facing said opening, said lens having a body portion of clear transparency and a second portion of light-diffusing surface irregularity so disposed that said masking means, when in said third position, masks said first lens portion while leaving said second portion unmasked.

4. In a motor vehicle having a frontal surface formed with an opening, a shield for closing said opening, and a headlight mounted in back of the opening with a lens projecting light through said opening; pivot means for rotatably mounting the shield for upward and rearward movement with respect to the lens and opening, a three-position control rod connected to the pivot means and extending to a manually accessible point in the vehicle, releasable means for engaging and holding the rod, and thereby the shield, in positions corresponding to full closure of the opening, partial revelation of the lower portion only of the lens through said opening, and full revelation of the lens, respectively, an electric circuit for said headlight, and circuit contact means on said control rod for closing the circuit when the rod and shield are in the two last named positions, said contact means being disengaged when said rod and shield are in the first named full closure position.

LUTHER M. ASHLEY.